US009665968B2

(12) United States Patent
Novosad et al.

(10) Patent No.: US 9,665,968 B2
(45) Date of Patent: May 30, 2017

(54) COMPUTERIZED IMAGE RENDERING WITH PER-FRAME BUFFER SCENE SEGMENTATION

(75) Inventors: Justin Novosad, Verdun (CA); Dave Lajoie, Beloeil (CA); Eric Bourque, Laval (CA)

(73) Assignee: AUTODESK, INC., San Rafael, CA (US)

( * ) Notice: Subject to any disclaimer, the term of this patent is extended or adjusted under 35 U.S.C. 154(b) by 1231 days.

(21) Appl. No.: 12/197,190

(22) Filed: Aug. 22, 2008

(65) Prior Publication Data

US 2010/0045672 A1 Feb. 25, 2010

(51) Int. Cl.
G06T 15/50 (2011.01)
G06T 15/00 (2011.01)
G06T 15/80 (2011.01)
G06T 15/06 (2011.01)
G06T 15/60 (2006.01)

(52) U.S. Cl.
CPC ............ G06T 15/005 (2013.01); *G06T 15/06* (2013.01); *G06T 15/50* (2013.01); *G06T 15/506* (2013.01); *G06T 15/60* (2013.01); *G06T 15/80* (2013.01)

(58) Field of Classification Search
CPC ....... G06T 15/506; G06T 15/50; G06T 15/80; G06T 15/60; G06T 15/06
USPC ....... 345/419, 426, 506, 422, 505, 423, 545; 382/154, 284, 300, 132; 711/118; 715/848
See application file for complete search history.

(56) References Cited

U.S. PATENT DOCUMENTS

| | | | |
|---|---|---|---|
| 6,819,325 B2 * | 11/2004 | Boyd et al. ................... 345/559 |
| 7,142,216 B2 * | 11/2006 | Boyd et al. ................... 345/522 |
| 7,218,291 B2 * | 5/2007 | Abdalla et al. ................. 345/24 |
| 7,233,332 B2 * | 6/2007 | Lokovic et al. .............. 345/426 |
| RE40,411 E * | 7/2008 | Cooper ......................... 348/521 |
| 7,583,275 B2 * | 9/2009 | Neumann et al. ............ 345/633 |
| 2002/0126117 A1* | 9/2002 | Grzeszczuk ............ G06T 15/50 345/420 |
| 2004/0093462 A1* | 5/2004 | Roth ...................... G11C 15/04 711/108 |
| 2005/0073682 A1* | 4/2005 | Narasimhan ........... G01N 21/49 356/337 |
| 2005/0080602 A1* | 4/2005 | Snyder et al. ..................... 703/2 |
| 2005/0128196 A1* | 6/2005 | Popescu ................. G01B 11/25 345/420 |
| 2006/0055695 A1* | 3/2006 | Abdalla .................. G06T 11/40 345/426 |
| 2007/0075998 A1* | 4/2007 | Cook ...................... G06T 13/00 345/426 |
| 2008/0228449 A1* | 9/2008 | Birtwistle et al. ................ 703/1 |
| 2009/0002379 A1* | 1/2009 | Baeza ....................... G06T 1/20 345/522 |

(Continued)

*Primary Examiner* — Abderrahim Merouan
(74) *Attorney, Agent, or Firm* — Artegis Law Group, LLP (57) ABSTRACT

One embodiment of the present invention sets forth a technique for image rendering with per-frame buffer scene segmentation. A user specifies how geometric objects, light sources, and various types of rendering operations in a graphics scene are associated. A segmentation API translates scene data into specific instructions used by a rendering engine that cause the rendering engine to generate a set of scene segments within a set of user specified frame buffers. The scene segments may be composited together using a variable contribution value for each scene segment to generate a final image.

18 Claims, 5 Drawing Sheets

(56) References Cited

U.S. PATENT DOCUMENTS

2009/0303247 A1* 12/2009 Zhang et al. .................. 345/594
2010/0073369 A1* 3/2010 McCombe et al. ........... 345/426
2014/0222780 A1* 8/2014 Wu ................... G06F 17/30696
                                                                                                                          707/722

* cited by examiner

COMPUTERIZED IMAGE RENDERING WITH PER-FRAME BUFFER SCENE SEGMENTATION

BACKGROUND OF THE INVENTION

Field of the Invention

Embodiments of the present invention relate generally to rendering graphics images and more specifically to computerized image rendering with per-frame buffer scene segmentation.

Description of the Related Art

High-quality graphics rendering systems are conventionally used to generate highly refined images, such as photo-realistic images, from mathematical models of three-dimensional (3D) scenes. Unlike real time graphics rendering systems, which typically render sixty or more images per second, many high-quality graphics rendering systems commonly require several minutes to over a day to render a single image. Because the goal of high-quality rendering systems is to render images to the highest technically feasible standards, iterations of fine-tuning operations are frequently applied to each image before a final image is produced. Fine-tuning iterations are typically conducted by a user who may visually examine an image before accepting the image or proceeding with an additional fine-tuning iteration.

To minimize the enormous computational time and effort associated with fully rendering a high-quality image in conjunction with performing numerous fine-tuning iterations on the image, the overall rendering process is partitioned into a rendering phase and a compositing phase, wherein the fine-tuning iterations may be substantially performed in the compositing phase. In this approach, individual scene elements (objects within a virtual environment) or groups of scene elements may be independently rendered as scene segments that are stored within corresponding frame buffers. Computationally efficient compositing operations are then used to combine the scene segments to generate a final image. Contributions from individual segments may be adjusted in the compositing phase to perform fine-tuning operations without repeating a time consuming rendering phase. For example, if a specular highlight of a scene element is rendered into a separate segment, the intensity of the specular highlight may be adjusted independently via one or more compositing iterations to fine-tune the contribution of the specular highlight without re-rendering the image. Because the rendering phase comprises a significant majority of the overall computation time, and the compositing phase requires a relatively small amount of computation time, excellent overall efficiency is achieved with this approach, even when multiple compositing iterations are needed.

One key aspect to this partitioned approach involves determining how a scene should be decomposed into segments, according to individual scene elements or groups of scene elements. Typically, a user may select one or more scene elements to be rendered separately from the other scene elements, which are excluded from rendering. The scene elements of the decomposed scene are then rendered in separate rendering passes to generate each respective scene segment.

This approach has at least two significant drawbacks. The first drawback is that in a given rendering pass, excluded scene elements do not contribute to a rendered segment of selected scene elements, resulting in degradation of both image quality and realism. For example, a selected scene element that is supposed to be reflective will not actually include a reflection of a nearby scene element that is excluded from rendering. As a result of this drawback, users are faced with a complex scene element management problem, requiring additional effort to avoid obvious lapses in realism. The second drawback is that multiple rendering passes are required to render segments into multiple separate frame buffers, thereby requiring additional rendering computation and complexity, and reducing overall efficiency.

As the foregoing illustrates, what is needed in the art is a technique for enabling efficient generation and fine-tuning of high-quality graphics.

SUMMARY OF THE INVENTION

One embodiment of the present invention sets forth a method for rendering images with per-frame buffer scene segmentation. The method includes the steps of receiving geometric object data associated with a graphics scene, receiving lighting data associated with the graphics scene, receiving relationship data that associates one or more objects in the graphics scene with one or more lights in the graphics scene, generating a contribution map based on the relationship data that indicates one or more rendering pass types corresponding to one or more lighting characteristics, and generating rendering instructions for rendering the graphics scene on a segment-by-segment basis, where each segment is defined by a rendering pass type and one or more geometric objects associated with one of the one or more lighting characteristics, and each rendered segment is stored in a different frame buffer.

One advantage of the disclosed method is that it simplifies how relationships between graphics objects and rendered segments are managed and also enables multiple segments to be rendered in a single rendering phase.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Figure 1:
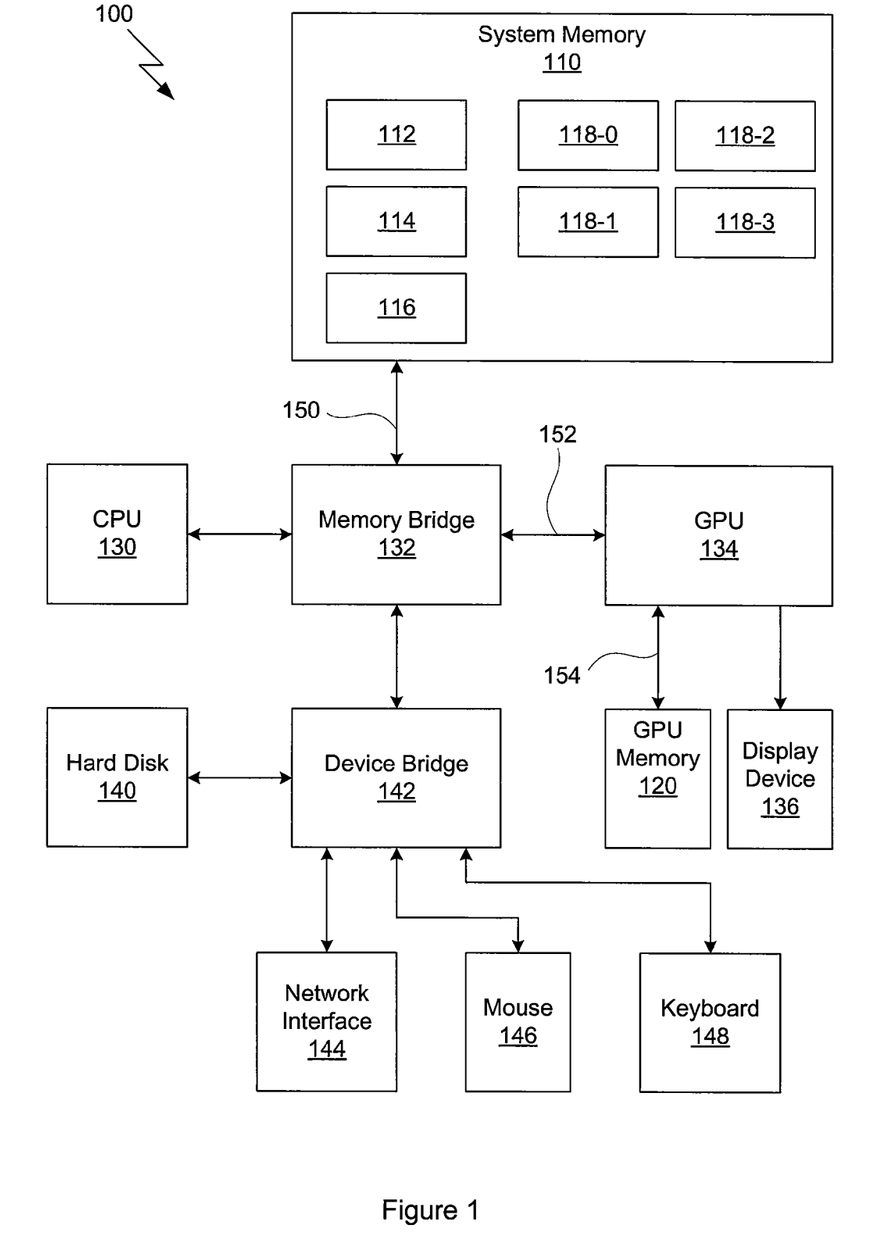
FIG. 1 illustrates a computer system configured to implement one or more aspects of the present invention.

FIG. 1 illustrates a computer system 100 configured to implement one or more aspects of the present invention. The computer system 100 includes, without limitation, a central processing unit (CPU) 130, a system memory 110, a graphics processing unit (GPU) 134, a GPU memory 120, a memory bridge 132, a display device 136, a hard disk 140, a device bridge 142, a network interface 144, a mouse 146, and a keyboard 148.

The CPU 130 communicates with the system memory 110 via the memory bridge 132, which may be, e.g., a Northbridge device or subsystem. System memory 110 is configured to store application programs, as well as data used by or generated by the CPU 130. System memory 110 is coupled to the memory bridge 132 via a system memory bus 150. The memory bridge 132 is coupled to the GPU 134 via a GPU system bus 152. The GPU system bus 152 may comprise any technically feasible data interconnect, such as the well known personal computer interconnect (PCI) express bus. The memory bridge 132 is also coupled to the device bridge 142 using an interconnect system such as PCI. The GPU 134 conventionally incorporates real time image rendering means for rendering both three-dimensional (3D) and two-dimensional (2D) images. The GPU 134 delivers pixel data to display device 136, which may comprise a conventional CRT or LCD display. The GPU 134 is coupled to the GPU memory 120 using a GPU memory bus 154. The GPU memory 120 may be configured to store data used by or generated by the GPU 134. Data stored within the GPU memory 120 passes through the GPU 134 and the memory bridge 132 when accessed by the CPU 130. In some embodiments, the integrated circuit implementing the CPU 130 may incorporate additional functional blocks, such as the memory bridge 132 and the device bridge 142. In alternative embodiments, the integrated circuit implementing the GPU 134 may incorporate additional functional blocks, such as the memory bridge 132 and the device bridge 142.

The device bridge 142 is coupled to a hard drive 140, a network interface 144, a mouse 146, and a keyboard 148. The hard drive 140 provides mass storage of programs and data. The network interface 144 provides network connectivity to other computers using a local area network (LAN) interface using any suitable technology, such as Ethernet. The mouse 146 and keyboard 148 provide user input. Other components (not explicitly shown), including USB or other port connections, CD drives, DVD drives, film recording devices, and the like, may also be connected to I/O bridge 107. Communication paths interconnecting the various components in FIG. 1 may be implemented using any suitable protocols, such as PCI (Peripheral Component Interconnect), PCI Express (PCI-E), AGP (Accelerated Graphics Port), HyperTransport, Quick Path Interconnect, or any other bus or point-to-point communication protocol(s), and connections between different devices may use different protocols as is known in the art.

In one embodiment, system memory 110 is configured to store a graphics modeling application 112, a graphics rendering application 114, and a compositing application 116. The graphics rendering application 114 should include at least one shader, a rendering application programming interface (API) for interfacing to a rendering engine, and a segmentation API for interfacing to the rendering API. The shader may communicate with the rendering engine via the rendering API, via the segmentation API, or via both APIs. System memory 110 is also configured to store a plurality of frame buffers 118, which may be configured to store scene segments rendered by the rendering engine, and an image generated by the compositing application 116. The compositing application 116 combines segments according to a contribution value for each segment to generate a composite image. For example, the rendering application 114 may render segments stored in frame buffers 118-0 through 118-2, and the compositing application 116 may combine the segments to generate a composite image, such as a final image, stored in frame buffer 118-3.

In an alternative embodiment, a first computer system includes a modeling application, and may include a compositing application. Additionally, a set of one or more computer systems includes a least one instance of the graphics rendering application. The first computer system and the set of one or more computer systems are configured to communicate via a computer network. In this embodiment, the first computer system includes software configured to cause each computer system in the set of one or more computer systems to independently render and store scene segments.

Figure 2:
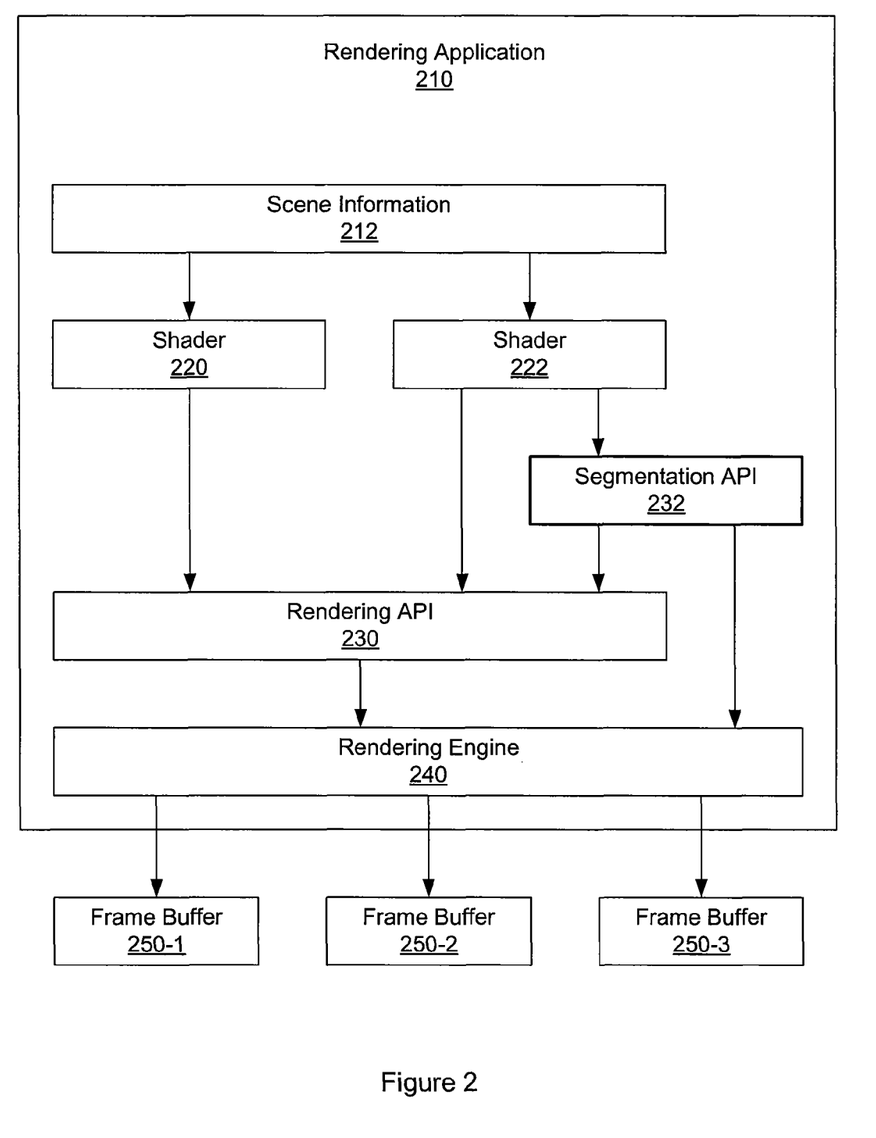
FIG. 2 illustrates a rendering application configured to generate per frame buffer scene segmentation, according to one embodiment of the invention.

FIG. 2 illustrates a rendering application 210 configured to generate per frame buffer scene segmentation, according to one embodiment of the invention. The rendering application 210 includes a data set of scene information 212, a shader 222, segmentation API 232, rendering API 230, and rendering engine 240. The rendering application 210 may also include shader 220. The rendering application 210 generates a plurality of scene segments and stores the scene segments in frame buffers 250.

The scene information 212 may include, without limitation, detailed descriptions of render objects (e.g., geometric objects), lights, cameras, render passes, and render layers that define associations between render objects, lights and render passes. Associations defined within a given render layer may be interpreted by the segmentation API 232 to generate a pass contribution map that is used to guide the rendering engine 240 in appropriately rendering each scene segment.

Scene information requiring no segmentation information may be processed using shader 220, which invokes rendering API 230 to generate an associated image. Scene information requiring segmentation information should be processed using shader 222, which invokes the segmentation API 232. In response to instructions from shader 222, the segmentation API 232 generates instructions for the rendering engine 240 to generate each scene segment and store each scene segment in an associated frame buffer 250.

Figure 3:
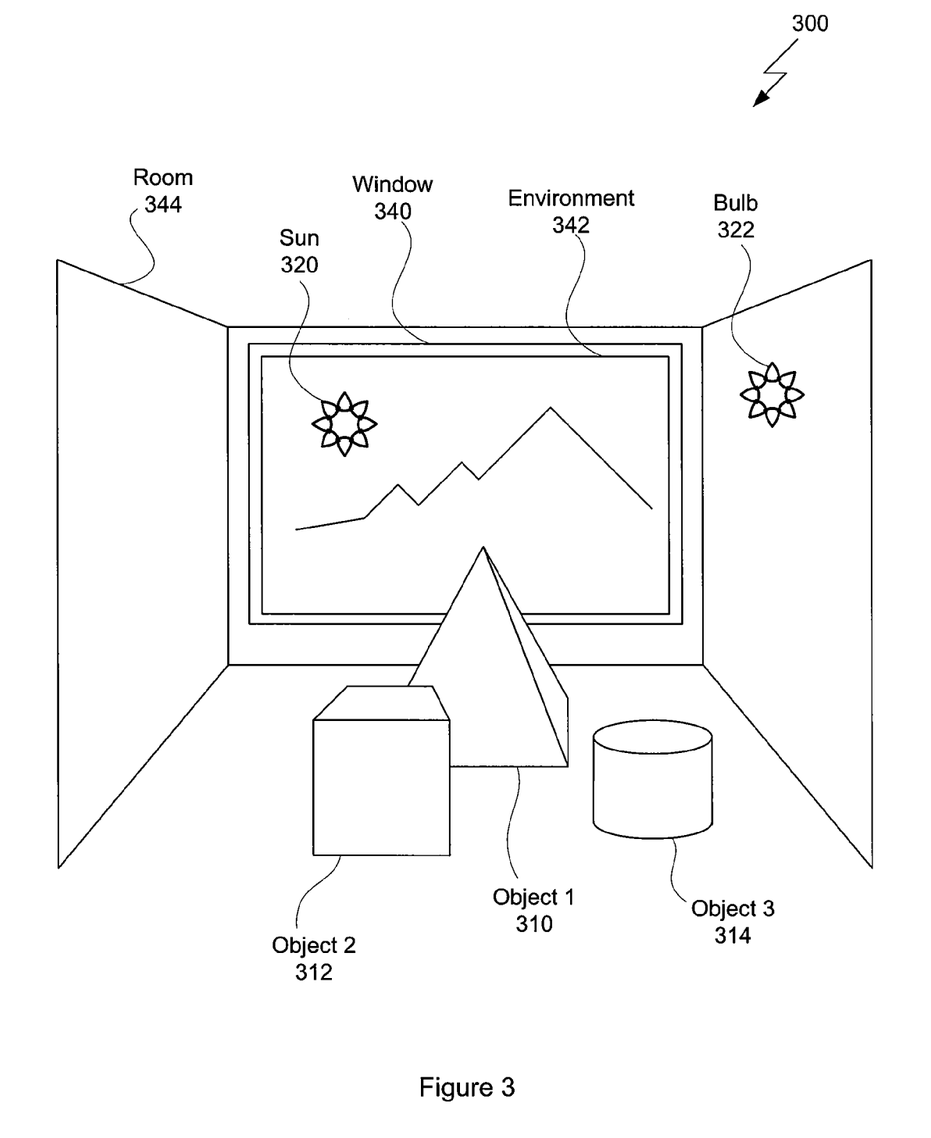
FIG. 3 illustrates a three-dimensional graphics scene.

FIG. 3 illustrates a three-dimensional graphics scene 300. The graphics scene 300 includes geometric objects such as a room 344 comprising rectangular panels, a window 340, an environment 342 comprising an image, object 1 310, object 2 312, and object 3 314. Graphics scene 300 also includes two lights, comprising a sun 320 and a bulb 322.

Object 1 310 may be rendered in isolation for the purpose of rendering scene segments into independent frame buffers 250 that may be used for fine-tuning the rendered image in a subsequent compositing phase. To maximize realism, object 1 310 should be rendered with other objects and lights, in context in the scene, wherein each rendering pass or group of rendering passes may be written to a separate frame buffer.

Figure 4:
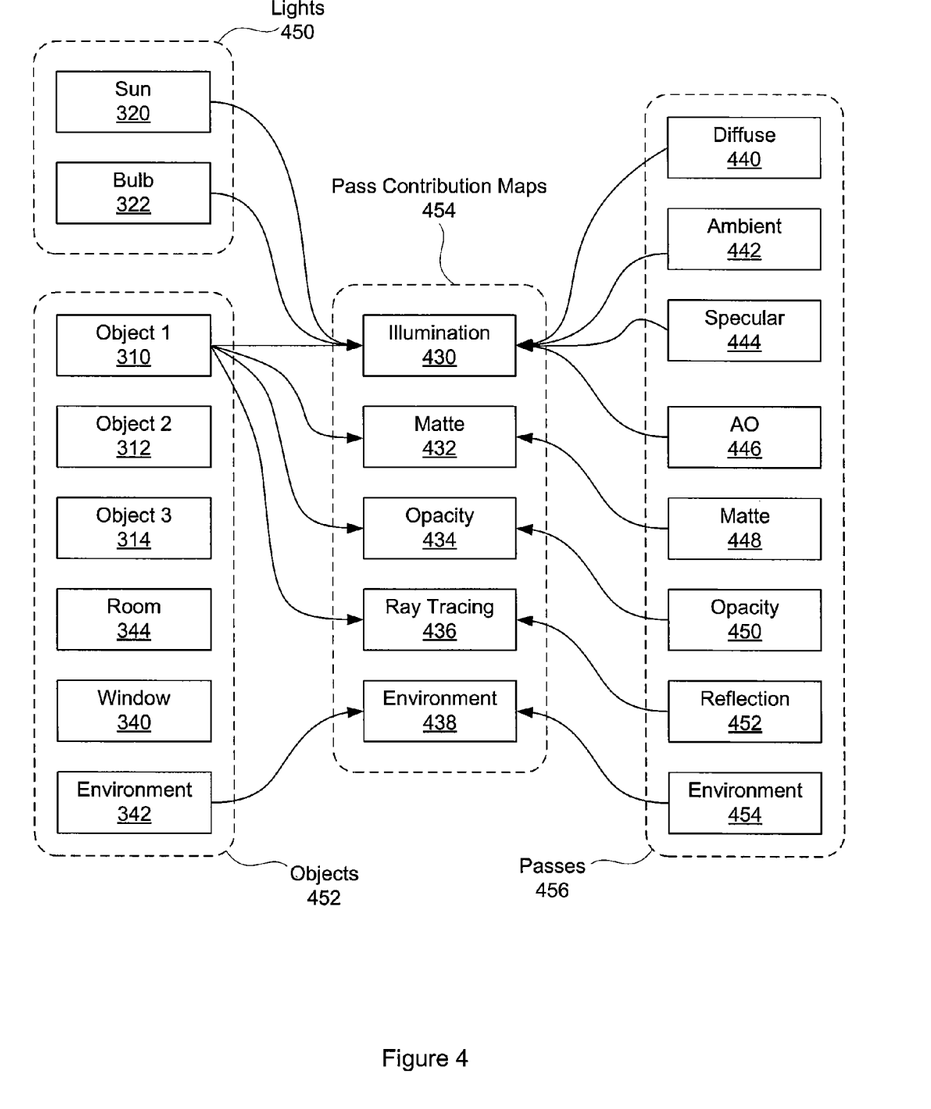
FIG. 4 illustrates associations between a rendering element and rendering passes, according to one embodiment of the invention.

FIG. 4 illustrates associations between a rendering element and rendering passes, according to one embodiment of the invention. In this example, the rendering element is object 1 310 of FIG. 3. Scene objects are organized into a list of objects 452. Lights are organized into a list of lights 450. Rendering passes are organized into a list of passes 456. Pass contributions from each rendering pass for a given object are organized into pass contribution maps 454, which define relationships among objects, lights, rendering passes, and lighting characteristics. In this example, a lighting characteristic is a related set of rendering passes or types of rendering passes.

As shown, rendering passes associated with object 1 310 include, without limitation, diffuse lighting 440, ambient lighting 442, specular lighting 444, ambient occlusion 446, matte surface mapping 448, opacity 450, and reflection 452. Environment mapping 454 is only associated with the environment object 342 in this example. Each rendering pass imparts a specific effect on object 1 310. The effects of multiple rendering passes may be grouped into pass contribution maps 454. For example, diffuse lighting 440, ambient lighting 442, specular lighting 444, and ambient occlusion 446 produce an illumination contribution 430; matte surface mapping 448 produces a matte pass contribution 432; rendering opacity 450 produces an opacity contribution 434; and, a reflection rendering pass 452 produces a ray tracing contribution 436.

For each object in the scene 300, the pass contribution maps 454 define associations between lights 450, objects 452, and rendering passes 456. These associations may be defined using any technically feasible means. In one embodiment, an application user may define associations between objects, lights, and rendering passes using a graphical user interface (GUI) associated with the rendering application 210 of FIG. 2. One exemplary layout of a GUI used to define associations between objects and rendering passes is illustrated in FIG. 4. Persons skilled in the art will recognize that a drag-and-drop scheme for defining associations may provide an intuitive and efficient entry means for users. Association data should be stored in scene information 212 for processing by shader 222 and segmentation API 232. By defining, rendering, and storing results of each rendering pass in a separate frame buffer, the user is able to subsequently fine-tune the contribution of each rendering pass (e.g., in a compositing application) without performing additional time consuming rendering operations.

In one embodiment, object, light, rendering pass, and frame buffer association information needed to generate the pass contribution maps 454 are transmitted to segmentation API 232, which performs translations that enable the rendering engine 240 to render each separate segment associated with each object (or set of objects) into a separate frame buffer.

Figure 5:
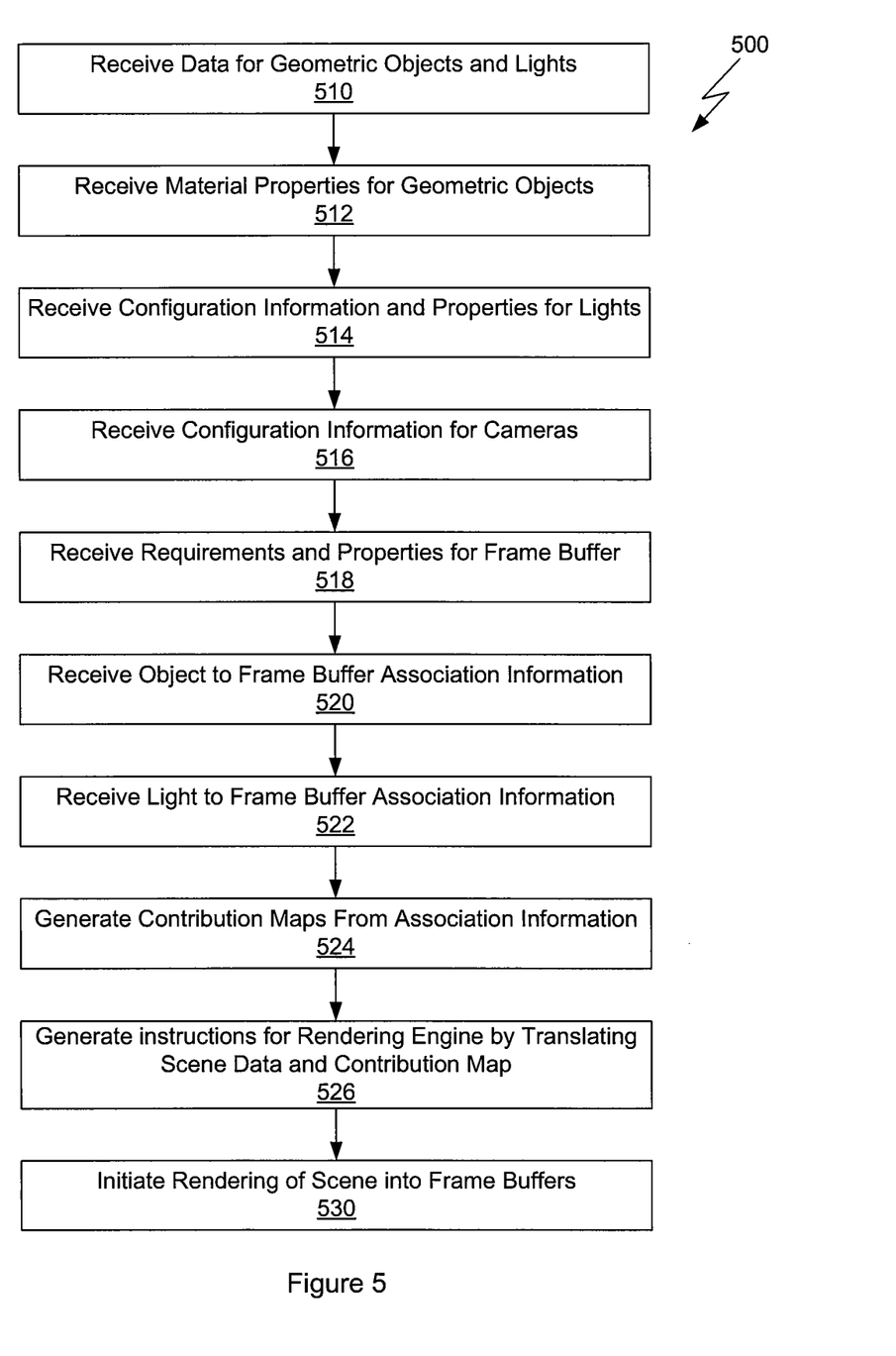
FIG. 5 is a flow diagram of method steps for rendering a segmented scene, according to one embodiment of the invention.

FIG. 5 is a flow diagram of method steps 500 for rendering a segmented scene, according to one embodiment of the invention. Although the method steps are described in conjunction with the systems of FIGS. 1 and 2, persons skilled in the art will understand that any system configured to perform the method steps, in any order, is within the scope of the invention.

The method begins in step 510, where the segmentation API 232 receives data for geometric objects and lights used in a graphics scene. This data may include, without limitation, geometric meshes, vertex attributes, lights and associated position information, and so forth. This data may be received in the form of one or more data structures, one or more API function calls that communicate data, or any other technically feasible technique. In step 512, the segmentation API 232 receives material properties for the geometric objects. Material properties may include, without limitation, texture maps and surface colors. In step 514, the segmentation API 232 receives configuration information and properties related to lights in the scene, including, without limitation, light emissions patterns, light maps, intensity values, and colors. In step 516, the segmentation API 232 receives configuration information for cameras established in the scene, including location and direction details for each camera.

In step 518, the segmentation API 232 receives requirements and properties for each requested frame buffer, which may be characterized by, without limitation, two-dimensional resolution and pixel depth. In step 520, the segmentation API 232 receives object to frame buffer association information, thereby establishing which objects, from the list of objects 452, are to be segmented and rendered into respective frame buffers. In step 522, the segmentation API 232 receives light to frame buffer association information, thereby establishing which lights from the list of lights 450 are associated with specific frame buffers and related objects.

In step 524, the segmentation API 232 generates contribution maps from association information received in steps 518 through 522. The contribution maps relate objects, lights and rendering passes with individual frame buffers, where each rendering pass may be associated with a specific lighting characteristic or other intermediate computation performed by a shader, such as shader 222.

In step 526, the segmentation API 232 generates instructions for the rendering engine by translating scene data and contribution map data into a format suitable for the rendering engine 240, while adhering to contribution map information that specifically details a mapping from scene segments to frame buffers. In other words, the contribution map information guides the rendering engine in performing rendering operations needed to satisfy requirements set forth in the contribution maps. The segmentation API 232 may use any technically feasible technique to translate scene data and generate rendering instructions.

In step 530, the segmentation API 232 initiates rendering of the scene into one or more frame buffers. In one embodiment, the rendering engine renders the scene into one or more frame buffers in a single rendering phase, wherein each rendering pass for each frame buffer is computed in a single launch of the rendering engine. In an alternative embodiment, one or more rendering passes are computed per launch of the rendering engine, where each launch of the rendering engine generates one or more scene segments, as specified by the contribution map.

In sum, a technique is disclosed for rendering images with per-frame buffer scene segmentation. A user specifies associations between objects, lights, and rendering passes in a graphics scene. A segmentation API translates scene data and contribution map information to generate specific instructions to a rendering engine that cause the rendering engine to generate a set of scene segments within a set of frame buffers. A compositing application may be used to generate final images from the scene segments.

While the forgoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention. Therefore, the scope of the present invention is determined by the claims that follow.

We claim:

1. A method for rendering images with per-frame buffer scene segmentation, the method comprising:
receiving geometric object data associated with a graphics scene;
receiving lighting data associated with the graphics scene;
receiving relationship data that associates one or more objects in the graphics scene with one or more lights in the graphics scene;
generating a contribution map based on the relationship data that indicates a first relationship between a first buffer and at least one object, at least one light, and at least one type of rendering pass and a second relationship between a second buffer and at least one object, at least one light, and at least one type of rendering pass; and
generating rendering instructions for rendering a first segment and a second segment of the graphics scene, wherein the first segment comprises the at least one object related to the first buffer and the first rendered segment is stored in the first frame buffer, wherein the second segment comprises the at least one object related to the second buffer, and the second rendered segment is stored in the second frame buffer, the first segment and the second segment being rendered in one rendering phase.

2. The method of claim 1, wherein the geometric object data comprises one or more triangles and one or more material properties associated with each of the one or more triangles.

3. The method of claim 1, wherein the lighting data comprises one or more lights and one or more lighting properties associated with each of the one or more lights.

4. The method of claim 1, wherein the generated rendering instructions include camera configuration information.

5. The method of claim 1, wherein the step of receiving relationship data comprises the steps of:
receiving requirements that define one or more attributes for at least one frame buffer;
receiving object-to-frame buffer relationship information; and
receiving light-to-frame buffer relationship information.

6. The method of claim 5, further comprising the step of initiating the rendering the graphics scene based on the generated rendering instructions.

7. The method of claim 1, wherein the contribution map is generated by a segmentation application programming interface disposed between a shader and a rendering engine within a rendering application.

8. The method of claim 1, wherein the contribution map specifies, for each object in the graphics scene, relationships between the object and one or more lights in the graphics scene, at least one lighting characteristic, and a plurality of related light rendering pass types corresponding to each lighting characteristic.

9. The method of claim 1, wherein the first segment and the second segment are rendered in one rendering phase via a single launch of a rendering engine.

10. The method of claim 1, wherein the first relationship and the second relationship in the contribution map are specified by a user via a graphical user interface.

11. The method of claim 1, further comprising receiving requirements for the first and second buffers comprising two-dimensional resolution and pixel depth.

12. A non-transitory computer-readable medium including instructions that, when executed by a processing unit, cause the processing unit to render images with per-frame buffer scene segmentation, by performing the steps of:
receiving geometric object data associated with a graphics scene;
receiving lighting data associated with the graphics scene;
receiving relationship data that associates one or more objects in the graphics scene with one or more lights in the graphics scene;
generating a contribution map based on the relationship data that indicates a first relationship between a first buffer and at least one object, at least one light, and at least one type of rendering pass and a second relationship between a second buffer and at least one object, at least one light, and at least one type of rendering pass; and
generating rendering instructions for rendering a first segment and a second segment of the graphics scene, wherein the first segment comprises the at least one object related to the first buffer and the first rendered segment is stored in the first frame buffer, wherein the second segment comprises the at least one object related to the second buffer, and the second rendered segment is stored in the second frame buffer, the first segment and the second segment being rendered in one rendering phase.

13. The non-transitory computer-readable medium of claim 12, wherein the geometric object data comprises one or more triangles and one or more material properties associated with each of the one or more triangles.

14. The non-transitory computer-readable medium of claim 12, wherein the lighting data comprises one or more lights and one or more lighting properties associated with each of the one or more lights.

15. The non-transitory computer-readable medium of claim 12, wherein the generated rendering instructions include camera configuration information.

16. The non-transitory computer-readable medium of claim 12, wherein the step of receiving relationship data comprises the steps of:
receiving requirements that define one or more attributes for at least one frame buffer;
receiving object-to-frame buffer relationship information; and
receiving light-to-frame buffer relationship information.

17. The non-transitory computer-readable medium of claim 16, further comprising the step of initiating the rendering the graphics scene based on the generated rendering instructions.

18. The non-transitory computer-readable medium of claim 12, wherein the contribution map is generated by a segmentation application programming interface disposed between a shader and a rendering engine within a rendering application.

* * * * *